US011891928B2

(12) United States Patent
Walter (10) Patent No.: US 11,891,928 B2
(45) Date of Patent: Feb. 6, 2024

(54) HYDRAULIC VALVE WITH LINEAR ADJUSTABLE THROTTLING GATE AND A HYDRAULIC VELOCITY FUSE THROTTLING GATE (71) Applicant: The Oilgear Company, Traverse City, MI (US)

(72) Inventor: Christopher Jon Walter, Traverse City, MI (US)

(73) Assignee: The Oilgear Company, Traverse City, MI (US)

( * ) Notice: Subject to any disclaimer, the term of this patent is extended or adjusted under 35 U.S.C. 154(b) by 340 days.

(21) Appl. No.: 16/901,062

(22) Filed: Jun. 15, 2020

(65) Prior Publication Data
US 2020/0400046 A1 Dec. 24, 2020

Related U.S. Application Data (60) Provisional application No. 62/863,368, filed on Jun. 19, 2019.

(51) Int. Cl.
*F01L 9/10* (2021.01)
*F16K 31/04* (2006.01)
(Continued)

(52) U.S. Cl.
CPC .............. *F01L 9/10* (2021.01); *E21B 19/006* (2013.01); *F16K 17/04* (2013.01); *F16K 31/047* (2013.01);
(Continued)

(58) Field of Classification Search
CPC ....... E21B 19/006; F01L 9/10; F01L 2305/02; B63B 39/03; F16K 31/047; F16K 31/122; F16K 31/508; F16K 17/04
See application file for complete search history.

(56) References Cited

U.S. PATENT DOCUMENTS 3,324,741 A * 6/1967 Anderson ............... E21B 34/04
251/71
3,511,476 A 5/1970 Horton
(Continued)

FOREIGN PATENT DOCUMENTS

GB 2475936 A 6/2011
GB 2503062 A * 12/2013 ............. B63B 39/03
(Continued)

OTHER PUBLICATIONS

Lafave, et al., Drilling Rigs Stand Up to the Power of the Ocean, Hydraulics & Pneumatics, May 31, 2004, pp. 1-8.
(Continued)

*Primary Examiner* — Aaron L Lembo
(74) *Attorney, Agent, or Firm* — David G. Woodral; GableGotwals (57) ABSTRACT A hydraulic valve having a body defining an inlet and an outlet. A motor is supported by the body and operates a shaft extending through an interior of the body, the shaft terminating in a gate. A spring is supported within the housing and influences the gate in an open position to permit fluid flow between the inlet and outlet. Upon the occurrence of a pressure differential resulting from a fluid flow through the inlet exceeding a biasing force of the spring, the gate is caused to displace against a valve seat communicating the inlet with the outlet in order to interrupt fluid flow in a standby mode and to define a closed position. The motor operates in a further throttling mode to linearly and incrementally displace the gate between the open and closed positions said outlet and in order to adjust flow through the outlet.

20 Claims, 7 Drawing Sheets (51) Int. Cl.
*E21B 19/00* (2006.01)
*F16K 17/04* (2006.01)
*F16K 31/122* (2006.01)
*F16K 31/50* (2006.01)
*B63B 39/03* (2006.01)

(52) U.S. Cl.
CPC .......... *F16K 31/122* (2013.01); *F16K 31/508* (2013.01); *B63B 39/03* (2013.01); *F01L 2305/02* (2020.05)

(56) References Cited

U.S. PATENT DOCUMENTS

| | | | |
|---|---|---|---|
| 3,512,421 A * | 5/1970 | Anderson | F16K 31/05 251/71 |
| 4,121,806 A | 10/1978 | Iato et al. | |
| 4,215,851 A | 8/1980 | Holmen | |
| 4,644,748 A * | 2/1987 | Goss, Jr. | F16H 61/47 60/494 |
| 4,724,673 A | 2/1988 | Curnow | |
| 5,497,672 A * | 3/1996 | Appleford | F16K 31/047 251/71 |
| 6,017,015 A | 1/2000 | Heusser | |
| 6,315,264 B1 * | 11/2001 | Baker | F16K 31/122 251/14 |
| 6,443,180 B1 | 9/2002 | Samuelson et al. | |
| 6,691,784 B1 | 2/2004 | Wanvik | |
| 6,845,702 B2 | 1/2005 | Sagawa et al. | |
| 7,329,070 B1 | 2/2008 | Trent et al. | |
| 7,819,195 B2 | 10/2010 | Ellis | |
| 7,918,060 B2 | 4/2011 | Gobeil | |
| 8,047,122 B1 | 11/2011 | Trent et al. | |
| 8,157,013 B1 | 4/2012 | Trent | |
| 8,596,608 B2 * | 12/2013 | Grimseth | E21B 33/0355 251/74 |
| 8,757,204 B1 | 6/2014 | Trent et al. | |
| 8,757,205 B1 | 6/2014 | Trent et al. | |
| 9,115,702 B2 | 8/2015 | Hugosson | |
| 9,657,754 B2 | 5/2017 | Matsushima | |
| 10,007,273 B2 * | 6/2018 | Martino | E21B 34/025 |
| 10,352,130 B2 | 7/2019 | Tolman et al. | |
| 10,365,669 B2 | 7/2019 | Groves et al. | |
| 10,508,745 B2 | 12/2019 | Groves et al. | |
| 10,563,787 B2 * | 2/2020 | Yates | F16K 31/046 |
| 2004/0135112 A1 * | 7/2004 | Greeb | F16K 31/047 251/214 |
| 2005/0029476 A1 * | 2/2005 | Biester | H02M 7/217 251/58 |
| 2007/0196182 A1 | 8/2007 | Ellis | |
| 2011/0240305 A1 | 10/2011 | Kristensen et al. | |
| 2012/0234117 A1 * | 9/2012 | Oswald | F16K 31/047 74/89.23 |
| 2015/0167832 A1 | 6/2015 | Van Druten et al. | |
| 2016/0186883 A1 | 6/2016 | Rausch | |
| 2017/0083030 A1 | 3/2017 | Groves et al. | |
| 2019/0032806 A1 * | 1/2019 | Eriksen | E21B 33/064 |
| 2020/0077910 A1 | 3/2020 | Qu et al. | |

FOREIGN PATENT DOCUMENTS

| | | | | |
|---|---|---|---|---|
| GB | 2503063 A | * | 12/2013 | B63B 39/03 |
| KR | 10-2011-0043611 A | | 4/2011 | |
| WO | 2002-18800 A2 | | 3/2002 | |
| WO | WO-0218800 A2 | * | 3/2002 | F15B 13/015 |
| WO | 2020077910 A1 | | 4/2020 | |

OTHER PUBLICATIONS

Woodacre, et al., A Review of Vertical Motion Heave Compensation Systems, Ocean Engineering, 2015 Elsevier Ltd., pp. 140-154, 2015.
Bosch Rexroth AG, Heave Compensation Systems: Keeping Loads Steady Under Any Conditions, The Drive & Control Company, Bosch Rexroth AG, 2015, pp. 1-20.
International Search Report and Written Opinion issued by the Korean Intellectual Property Office as International Searching Authority for International Patent Application No. PCT/US2020/037842 dated Sep. 25, 2020 (9 pages).

* cited by examiner

HYDRAULIC VALVE WITH LINEAR ADJUSTABLE THROTTLING GATE AND A HYDRAULIC VELOCITY FUSE THROTTLING GATE

CROSS REFERENCE TO RELATED APPLICATIONS

The present application claims the priority of USSN 62/863,368 filed Jun. 19, 2019.

FIELD OF THE INVENTION

The present invention relates generally to a linear adjustable hydraulic valve. More specifically, the present invention discloses a hydraulic valve such as which can, in one non-limiting embodiment, be incorporated into a marine riser tensioner assembly which includes a combination of air pressure vessels, piping, valve, accumulator and compensating cylinders supported upon a seaborne floating platform which can be located in deeper waters in which the platform is stationary positioned but not fixed to the sea floor. A conventional marine drilling rig assembly includes a riser extending downwardly from the seaborne platform within a body of water and, in use, requires a constant tension force applied thereto in order to maintain the integrity of the riser and to prevent damage to the riser resulting from excessive tensile or compressive forces resulting from the heaving motion of the platform in response to wave conditions.

In use, vertical motion exerted upon the platform, and such as resulting from upward heaving and downward falling of the vessel in response to repetitive wave induced motion, would result in damage to the riser and drill string without compensating for this relative vertical motion. The tensioner assembly incorporating the present hydraulic valve of the present invention prevents damage from the riser and descending rig via rapidly adjusting the tension forces exerted against the riser tensioning ring and slip joint in response to the heaving motion of the platform and is an improvement over prior art isolation type valves which require external drain tanks and refill systems.

In a standby mode, the valve is kept open via a spring acting on a piston and poppet assembly communicating with a cylinder outlet, this in order to maintain the drill string in its vertical position while the wave action raises and lowers the vessel (such as by permitting flow between the accumulator and cylinder components). In the instance of fluid flow from the accumulator inlet port to the outlet to cylinder port exceeding a predefined limit, the valve automatically closes.

The valve further operates in a throttle mode (such as during operation of the drill string) in which a pair of upper and lower valve solenoids are closed and in order to slave a roller screw shaft to a valve motor driven shaft. The roller screw shaft includes a threaded and vertically adjustable nut in turn supporting the piston and poppet between variable adjusted positions with the outlet to cylinder port. In this configuration, the linear positon of the piston and poppet assembly can be controlled via the motor responding to constant feedback provided by a valve positioned sensor incorporated into the valve housing and which monitors the position of the piston and poppet assembly and in order to tension the riser according to the desired operational parameters as well as providing a drill string compensating system supporting a majority of the drill string weight to exert a desired downward force on the drill string end situated bit.

BACKGROUND OF THE INVENTION

The prior art is documented with hydraulic valves, such as which can be incorporated into a heave compensation system. As is known, a passive heave compensation (PHC) device acts as a spring device with a predefined, relatively low stiffness and allows relative motion while keeping load variations in the elongated suspended member, such as a marine drilling riser, within acceptable limits. A typical PHC device for riser systems consists of a hydraulic cylinder and a gas accumulator, between which is located an isolation type valve. The components are supported upon the drilling vessel, which further by definition includes any floating platform upon which the hydraulic components are situated, with the cylinder pistons being attached, such as via either a linear or rotary sheave connecting cable, to any vertically descending and elongated component not limited to a drill riser.

Typical marine tensioner assemblies can incorporate multiple cylinders connected to the marine riser. A first example of a conventional assembly is disclosed in U.S. Pat. No. 8,047,122, to Trent et al., which teaches a hydraulic tensioner assembly for detecting the position of a cylinder rod in each cylinder. Additional references include the tensioner assembly of U.S. Pat. No. 7,329,070, also to Trent, as well as the tensioner system of Trent U.S. Pat. No. 8,157,013 with recoil controls.

Other challenges posed by existing related assemblies include the requirement of a larger number of components which increases the incidences of discrete failure modes in operation. Existing approaches further require a high level of fluid cleanliness along with the installation of separate drain tanks, such leading to fluid calibration issues on the systems and significant filtration requirements.

SUMMARY OF THE INVENTION

The present invention discloses a hydraulic valve having a body defining an inlet and an outlet. A motor is supported by the body and operates a shaft extending through an interior of the body, the shaft terminating in a gate. A spring is supported within the housing and influences the gate in an open position to permit fluid flow between the inlet and outlet. Upon the occurrence of a pressure differential resulting from a fluid flow through the inlet exceeding a biasing force of the spring, the gate is caused to displace against a valve seat communicating the inlet with the outlet in order to interrupt fluid flow in a standby mode to define a closed position. The motor operates in a further throttling mode to linearly and incrementally displace the gate between the open and closed positions said outlet and in order to adjust flow through the outlet.

Additional features include the shaft including a driven shaft and a roller screw shaft, the roller screw shaft being rotatable with the driven shaft in the throttling mode and linearly displaceable relative thereto in the standby mode. The motor communicates with the driven shaft via a driving timing belt pulley supported within an upper end of the body and accessible upon removal of a cover, the driving timing belt pulley driving a timing belt connected further to a driven timing belt pulley which in turn rotates the driven shaft.

The driven shaft is connected to the roller screw shaft via a male spline on the driven shaft and a mating female spline on the roller screw shaft. A pair of upper and lower solenoid valves are provided which are open in the standby mode and closed in the throttling mode.

A valve position sensor operates in a continuous feedback loop with the motor to adjust the gate in the throttling mode. The roller screw shaft further includes a section with a larger diameter and a seating seal ring groove which forms a piston that seals against a sleeve configured within the valve body.

Other features include inter-engaging pluralities of male and female helical threads configured in opposing fashion between each of a bottom axial extending exterior portion of the roller screw shaft and mating opposing interior helical threads of a roller screw nut fixed within the body, such that rotation of the driven shaft in the throttling mode is communicated to the roller screw shaft to facilitate displacement of the gate. Also, the spring seats between an enlarged annular extending and diameter end portion of the roller screw shaft and an annular bottom support of the valve body proximate the piston and valve outlet.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

With reference to the appended illustrations, the present invention discloses a linear adjustable hydraulic throttling valve according to varied designs and applications. By non-limiting representation, the valve can be incorporated into a variety of applications associated with a vertically displacing support platform of some type and, as further described and illustrated by the following non-limiting preferred embodiments, such as associated with a passive heave compensation system for removing the load resulting from the vessel/platform heave (up and down) motion from the suspended load (e.g. vertically suspended marine riser and drill rig). Without limitation, the linear throttling hydraulic valve of the present invention with velocity fuse for automatic closing in the standby mode can be adapted to a variety of different installations or applications not limited to marine drill riser and rig tensioner assembly, such further being described and illustrated by exemplary embodiment.

Figure 1:
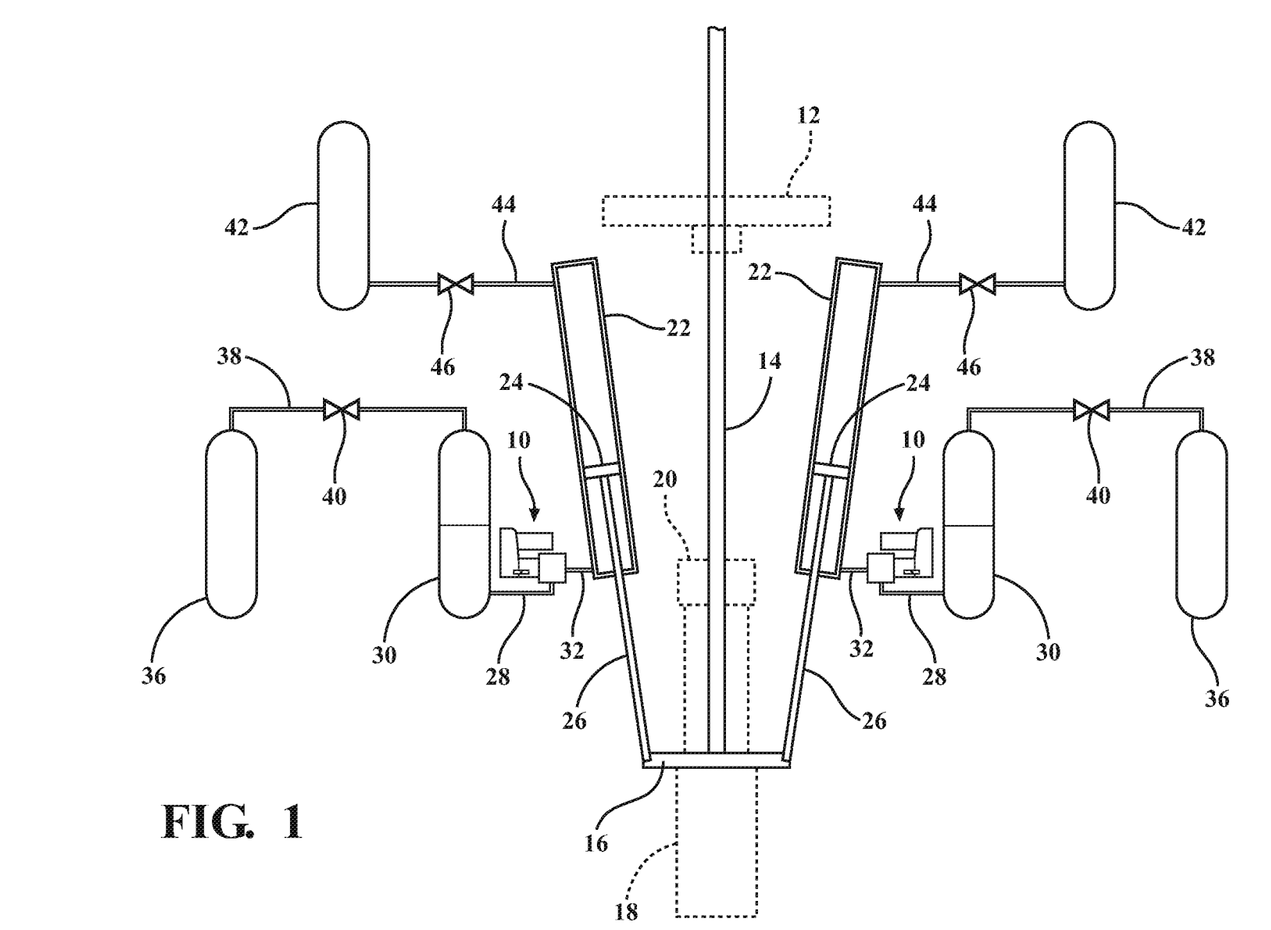
FIG. 1 is a schematic illustration of a passive heave tensioner assembly incorporating the isolation valve of the present assembly presented according to one non-limiting application.

With reference initially to FIG. 1, a schematic illustration is presented of a passive heave tensioner assembly incorporating the isolation valve, a pair of which are generally depicted at 10, of the present assembly presented according to one non-limiting application. As previously described, the illustrated and non-limiting application presented depicts a passive compensating heave assembly associated with a marine drill rig and riser tensioning application.

Components of the marine drilling assembly depicted include a production deck or platform 12 which his connected, via any number of extending supports 14, to a tensioner ring 16. The tensioner ring 16 is in turn secured to an outer barrel portion 18 of a slip joint assembly, with a further inner telescopic barrel portion 20 displace-ably supported relative to the outer portion in order to facilitate vertical heave compensating adjustment between the portions 18/20 responsive to the motion of the production deck 12 or other vessel induced up and down motions.

The tensioner ring 16 (or other suitable component) is in turn supported by any number of individual tensioner cylinders 22, these often provided in a circumferential surrounding array and in turn secured to the platform 12. The tensioner cylinders 22 each further include internally displacing pistons 24 with extending piston rods 26, these in connected to the tensioner ring 16 at remote ends thereof.

The linear throttling valves of the present invention are again shown at 10 and, as will be described with further reference to FIG. 3 et seq., are supplied by inlet lines 28 extending from hydraulic fluid accumulators 30, with outlet lines 32 extending to the tensioner cylinders 22 and communicating with the variable interior volume defined between the displaceable pistons 24 and the cylinder end surface through which projects the piston rods 26.

Additional components include high pressure (such as Nitrogen) vessels 36 which supply the accumulators 30 via supply lines 38, with suitable valves 40 configured in the lines 30 for controlling flow to the accumulators 30. Also provided are low pressure (e.g. such again as Nitrogen) vessels 42 which communicate, via additional lines 44 with suitable valves 46, to upper end locations of the tensioner cylinders located on opposite sides of the interior pistons 24 as compared to the valve outlets 32.

As previously noted, the core hydraulic system incorporates a combination of air pressure vessels, piping, valves, accumulators and compensating cylinders in order to constantly adjust and compensate forces exerted by the tensioner cylinder piston rods 26 upon the tensioner ring 16, such again resulting from the vertical heaving motion of the floating platform upon the body of water. As will be further described, and depending upon any combination of sea swell conditions as well as the operational status of the marine drilling rig assembly, the valve 10 of the present assembly can be operated in either of standby or throttling modes.

Figure 2:
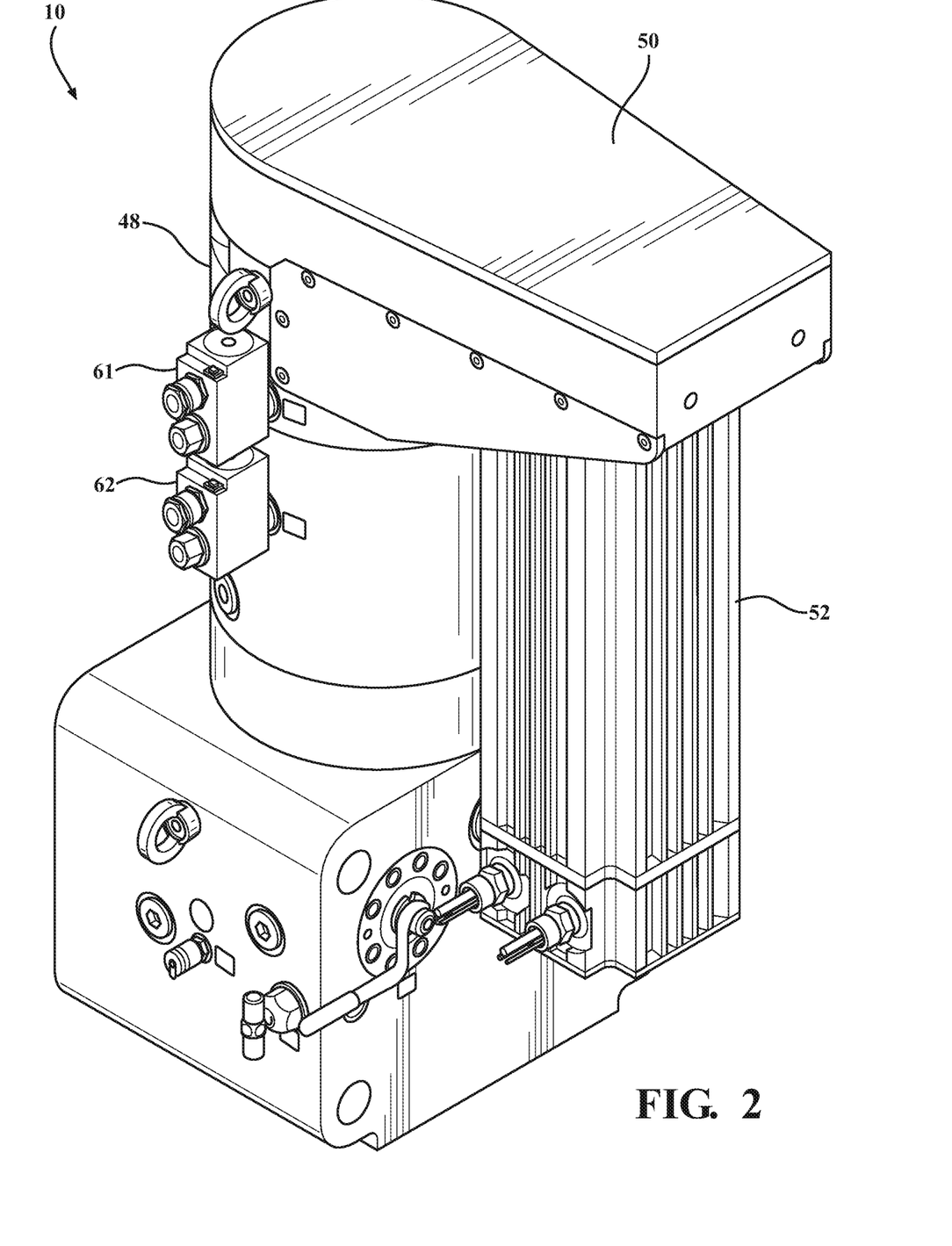
FIG. 2 is a rear looking perspective view of the linear adjustable hydraulic throttling valve according to a first non-limiting variant of the present invention.

Proceeding to FIG. 2, a rear looking perspective view is shown of the linear adjustable hydraulic throttling valve, again at 10, according to a non-limiting variant of the present invention. In combination with succeeding views FIGS. 3-6, the valve 10 incorporates a three dimensional shaped housing with a main body 48 and a removable lid or cover 50. An electric motor 52 extends downwardly from an extended upper end of the main body 48 and in a generally parallel fashion with respect to an axially extending and package defining interior of the main body.

Figure 4:
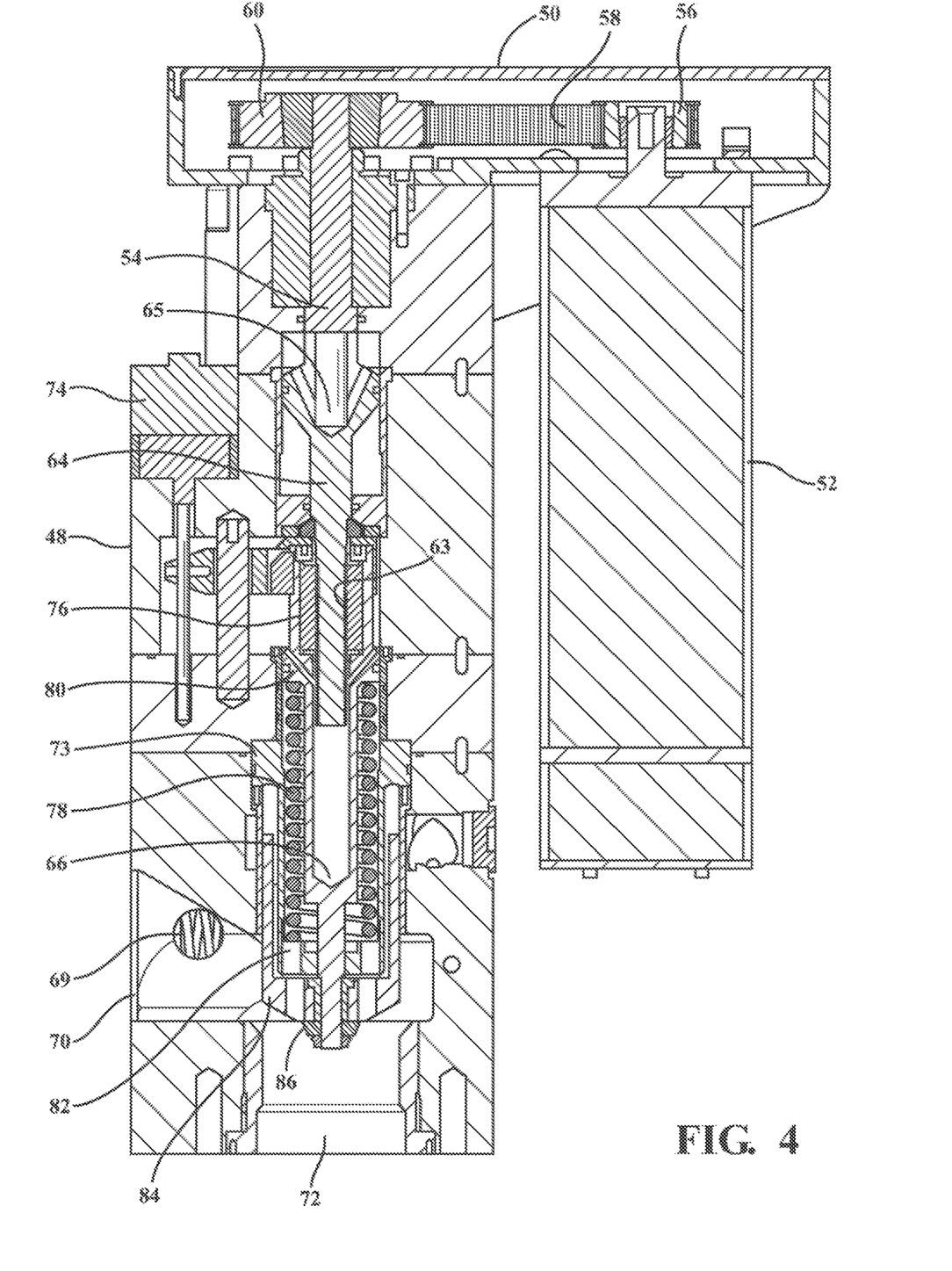
FIG. 4 is a first side cutaway view of the valve in either standby or throttle modes and shown in the open position.
Figure 5:
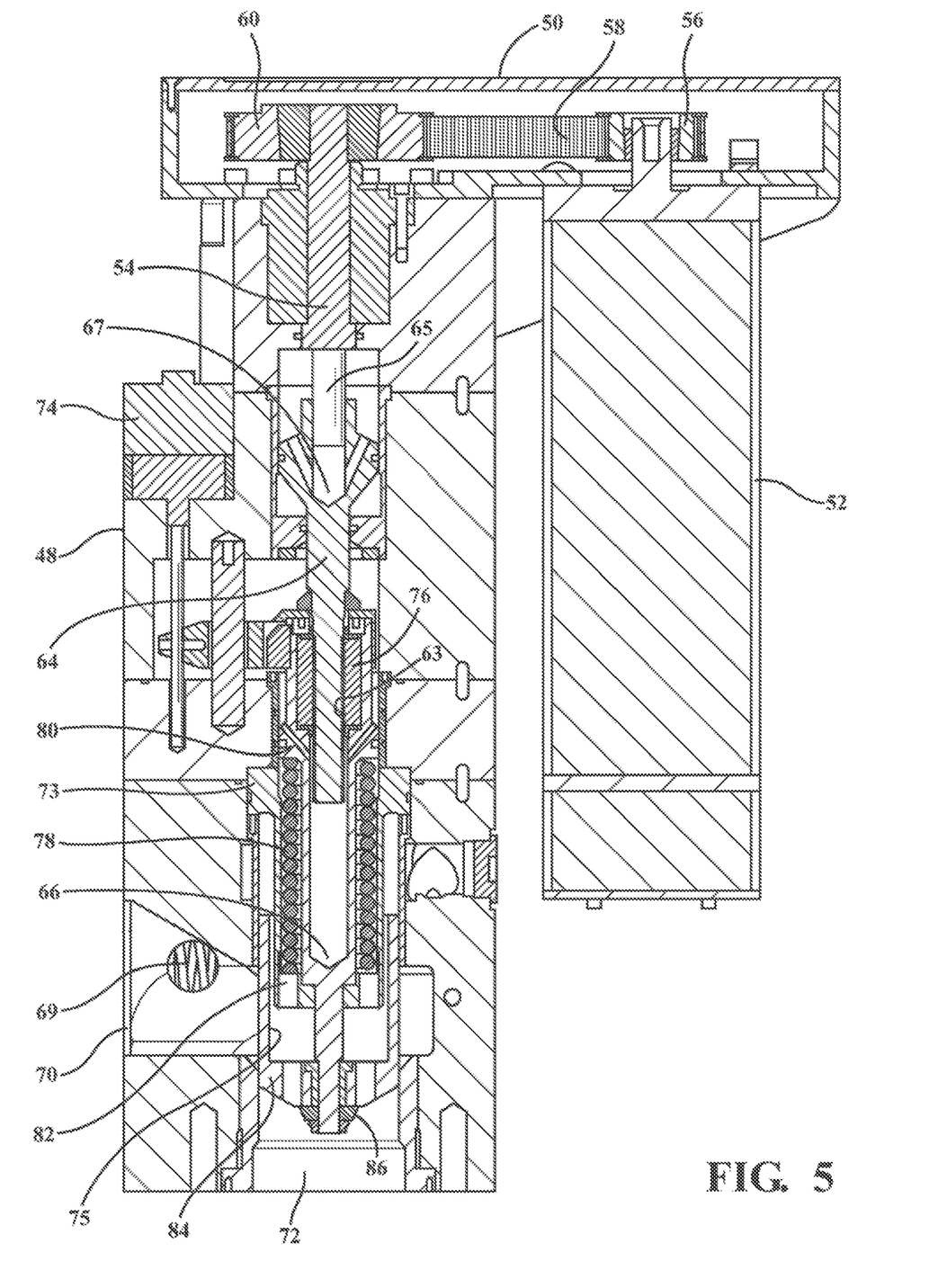
FIG. 5 is a succeeding view to FIG. 4 and illustrating the valve in the standby mode shown in the closed position.
Figure 6:
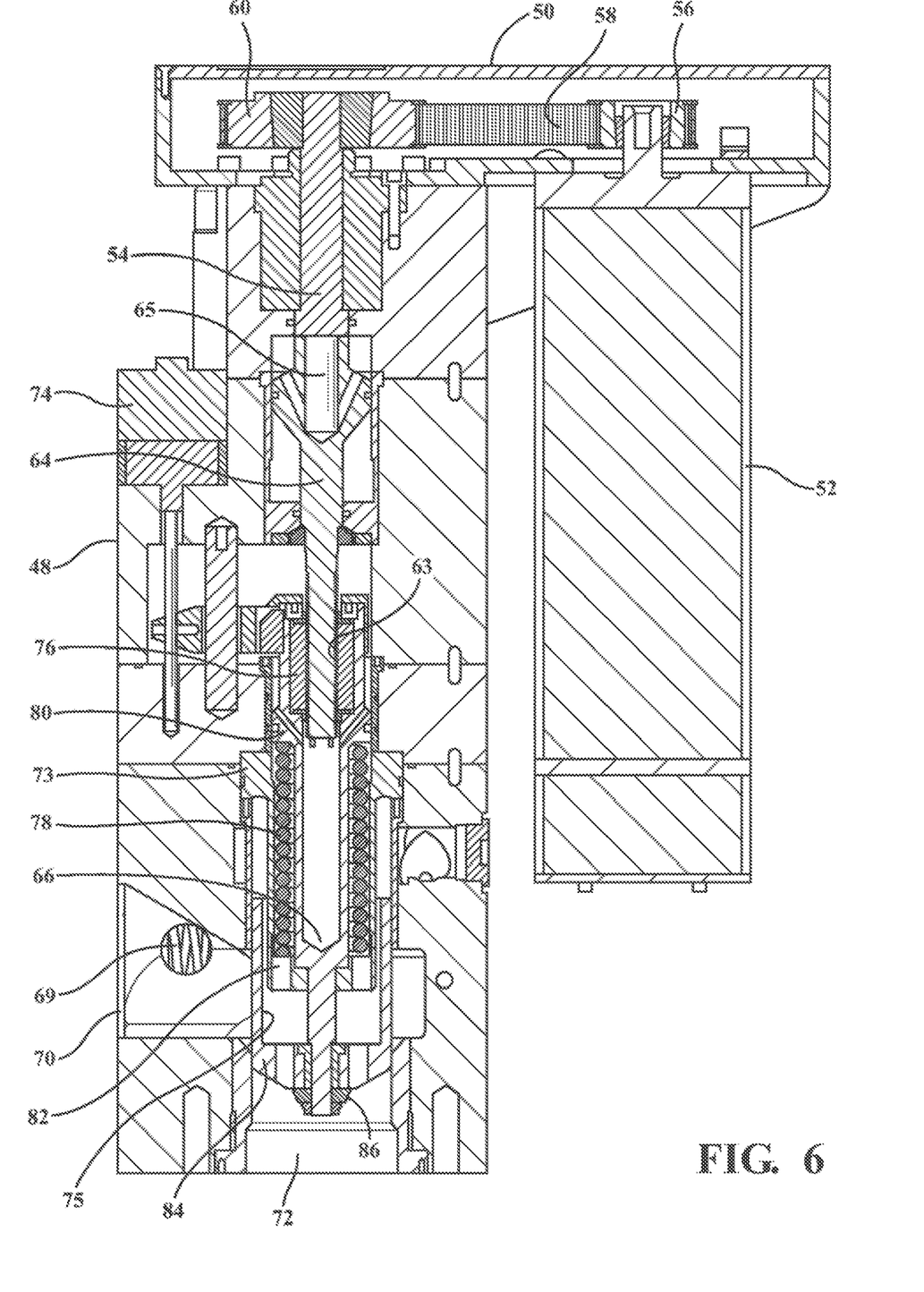
FIG. 6 is a further succeeding sectional view of the valve in the throttle mode and in the closed position.

As best shown in the cutaway views of FIGS. 4-6, the motor 52 communicates with a driven shaft 54 supported within an upper axial interior of the main body 48, this via an arrangement of a driving timing belt pulley 56 which drives a timing belt 58 connected further to a driven timing belt pulley 60 and which in turn rotates the driven shaft 54. The driven shaft 54 is connected to a roller screw shaft 64 via a male spline (see as generally referenced at 65 in FIG. 4) on the driven shaft and mating female splines (further at 67 in FIG. 5) on the roller screw shaft and which, as will be further described, permits linear separation of the roller screw shaft 64 from the driven shaft 54 in the standby mode operation.

Figure 3:
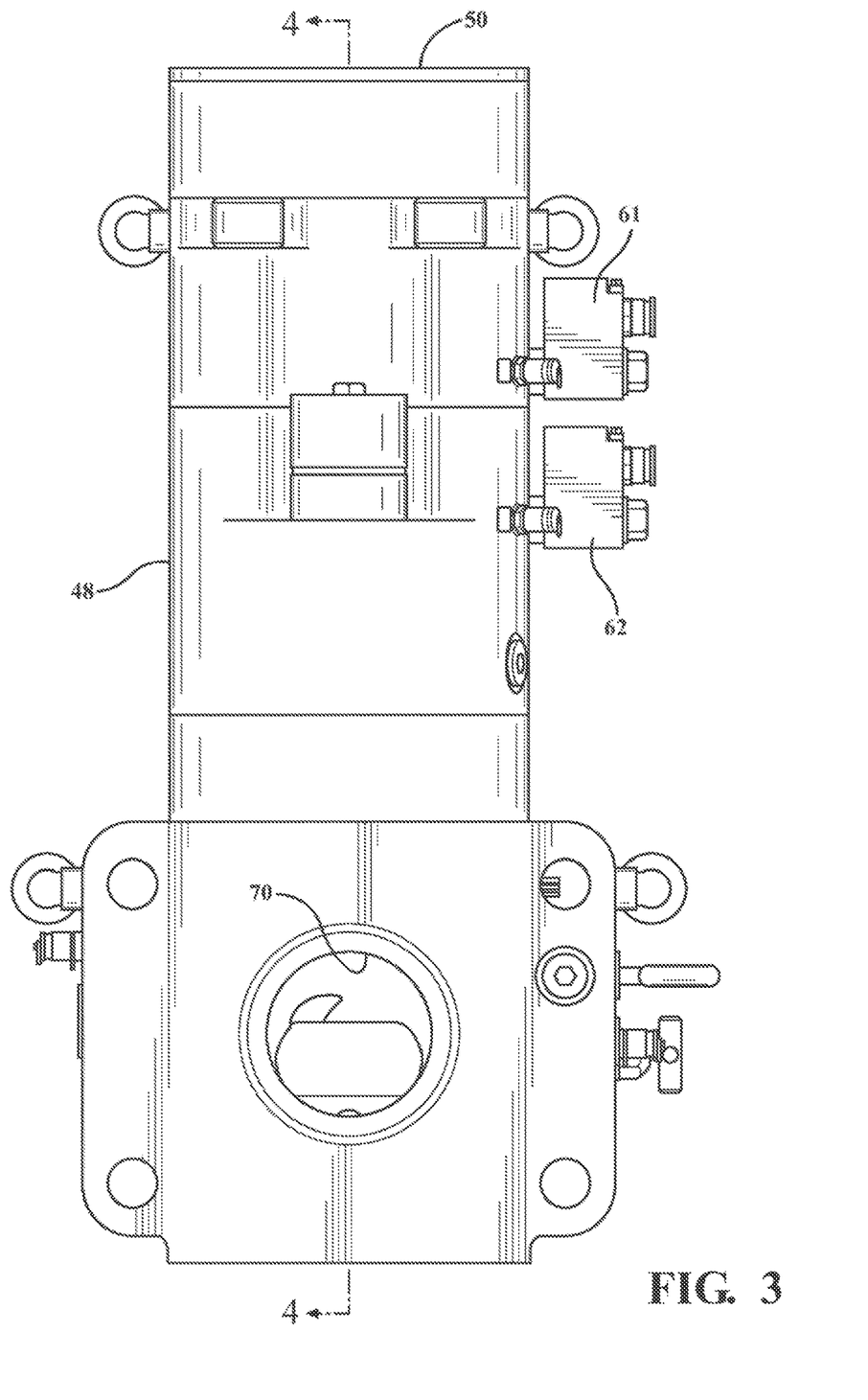
FIG. 3 is a front plan view of the valve of FIG. 2 depicting the inlet or accumulator port.

A pair of upper and lower 362 solenoid valves are shown in each of FIGS. 2 and 3 and, as will be further described, are open in the standby mode to correspond with the normally open position of the valve and the ability of the roller screw shaft 64 to linearly separate (via its female spline 67) from the engaging male spline 65 of the driven shaft 54. The solenoids 61/62 are further closed in the active/throttling mode in order to linearly couple a roller screw shaft 64 to the driven shaft 54 in order to provide for throttling adjustment of linear supported piston 66 and poppet 84 components relative to each of an accumulator input port 70 (see also FIG. 3 and referenced in combination with accumulator inlet lines 28 in the schematic of FIG. 1) and an outlet gate or port 72 of the valve (see also outlet lines 32 in FIG. 1 extending to hydraulic tensioner cylinders 22). Also shown in FIGS. 4-6 is a spring 78 for biasing the poppet 84 (shown also at inset 69).

With further reference to FIG. 4, a first side cutaway view of the valve 10 is referenced in either standby or throttle modes and shown in the open position. Additional components include a valve position sensor 74 which, as will be further described, operates in a continuous feedback loop with the position of the piston/poppet supported roller screw shaft 64 in the active throttling mode in order to constantly adjust the valve position based upon inputs from the sensor 74 to the motor 52.

Situated below the roller screw shaft 64 is a larger diameter portion at 73, for supporting a seal ring groove. These features form the piston 66 that seals against a sleeve (see at 75 in FIGS. 5-6) configured within the valve. Inter-engaging pluralities of male and female helical threads (see as referenced by male threads at 63 exhibited on the exterior of the lower roller screw shaft 64) are configured in opposing fashion between each of a bottom axial extending exterior portion of the roller screw shaft 64 and which mate with opposing interior helical threads of a roller screw nut 76, such that rotation of the driven shaft 54 is communicated to the roller screw shaft 64 during throttle mode operation and in order to facilitate displacement of the roller screw shaft as depicted between standby closed mode FIG. 5 and throttle closed mode of FIG. 6.

A spring 78 is provided and seats between an enlarged annular extending and diameter end portion 80 of the roller screw shaft 64 and an annular bottom support 82 of the valve proximate the piston 66 and the valve outlet 72. In this fashion, the upward influence by the spring 78 is exerted upon the piston 66 and poppet 84 in order to maintain the valve in a normally open position in either of the standby or throttling modes, with controlled linear actuation/throttling via rotation of the slaved driven shaft 54 and roller screw shaft 64 relative to the fixed roller screw nut 76 providing for continuous adjustment of the piston/poppet components of the associated linear gate for controlling fluid flow between the inlet 70 and outlet 72.

Accordingly, and in the standby mode as depicted in FIG. 4, the valve is normally open owing to the upward exerting forces of the spring 78. The roller screw shaft 64 and the piston 66/poppet 84 are likewise shown in their uppermost positions. In the event that fluid flow exceeds a determined threshold value, a pressure differential results in the upward force exerted by the spring 78 being overcome by the fluid flowing through the inlet port, causing the piston 66 and poppet 84 to displace downwardly to the closed position of FIG. 5. This is further again owing to the male 65 to female 67 splined arrangement between the driven shaft 54 and roller screw shaft 64 which permits the roller screw shaft to linearly displace from the driven shaft as shown in FIG. 5.

At this point, the roller screw shaft 64 in the condition of FIG. 5 is permitted to linearly displace with the piston 66 and poppet 84 to the closed position and by which a lower most annular throttling gate associated with the piston and poppet is displaced downwardly and seals the outlet 72 at a retainer location 86 to close the valve. As further noted, and in the standby mode, the electric motor 52, pulleys 56/60, timing belt 58 and driven shaft 54 are all deactivated.

Proceeding to FIG. 6, a further succeeding sectional view is shown of the valve in the throttle mode and in the closed position. Again, in the throttle mode, the valve is normally in the open position (such as again shown in FIG. 4) with the roller screw shaft 64 and piston 66/poppet 84 shown in their uppermost position. In this condition, the upper 61 and lower 62 solenoids are closed, the result of which is that the roller screw shaft 64 is prevented from translating relative to the driven shaft 54 and is held in the upward spline engaged position with the driven shaft.

In the position of FIG. 6, the position of the piston 66 and poppet 84 can be controlled in up and down directions by rotating the roller screw shaft 64 relative to the interiorly threaded nut 76. As further previously described, the valve position can be accurately controlled utilizing the valve position sensor 74 to instruct rotation of the electric motor 52. Without limitation, throttling mode operation in the described application typically occurs during conditions such as in response to stormy sea conditions or planned exercises such as upward retraction of the riser.

Figure 7:
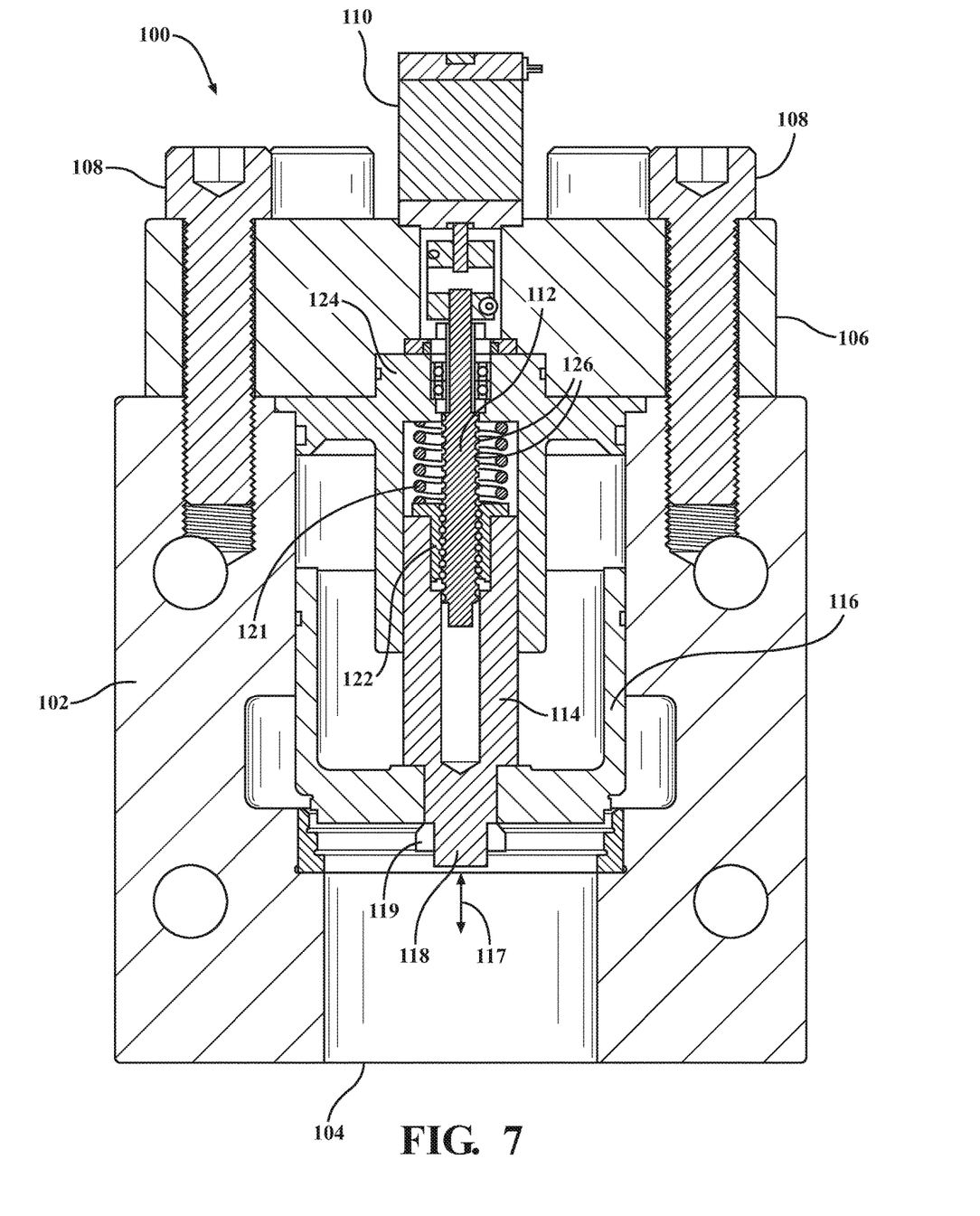
FIG. 7 is a cutaway illustration of a linear adjustable hydraulic throttling valve according to a second non-limiting variant of the present invention.

Referring finally to FIG. 7, a cutaway illustration is generally depicted at 100 of a linear adjustable hydraulic throttling valve according to a second non-limiting variant of the present invention. The valve construction of FIG. 7 is simplified from that shown in FIGS. 2-6 and includes a main body 102 within which is configured an accumulator inlet (hidden in the view shown but understood to be similar in representation to that depicted in the first valve embodiment 10), along with a separate and bottom disposed valve outlet 104.

The valve body 102 is closed by a valve cap 106 (see engagement bolts 108), with a motorized linear actuator 110 supported atop the valve cap and communicating with a rotatable and downwardly extending threaded screw 112. A piston 114 is supported upon the screw 112 and, along with a throttling gate 116, can be actuated via rotation of the screw in the throttling mode in order to adjust the piston position (see bi-directional arrow 117) relative to a bottom located seat 118 which displaces relative to a retaining nut 119 which in turn connects the gate 116 to the piston 114.

A spring 121 is again utilized and, in this instance, seated between an upper surface of a redesigned fixed roller screw nut 122 and an underside of a fixed supporting portion 124, this in order to normally bias the piston (along with any associated poppet) in the upward and open position. Actuation of the screw 112 (via the motorized linear actuator 110) further again causes helical outer windings 126 on the screw 112 to inter-rotated relative to additional interior helical threads on the redesigned screw nut 122 in order to adjust up and down motion of the piston 114 relative to the valve seat 118.

As with the initial embodiment 10, the valve 100 can also operate in a normally open position during standby mode and by which the force of the spring 118 exerts upwardly on the outer piston supported portion 124 to hold the throttling gate in the open position 116. Upon a load force exerting upon said gate exceeding the preset spring loaded force, the gate 116 independently, which is independently slaved to the outer support 124 in the downward direction, is displaced downwardly to the closed position independently of motorized screw 112.

By the present design, the invention allows for electrical and non-electrical high rate fluid flow control, via the electronically driven, linear actuated gate to modulate flow by command from a central electronic control console (not shown). In addition, and as previously described, the hydraulic valve offers a fluid flow velocity fuse in the standby mode by using a pressure differential over internal areas to produce a flow-based closure gate without electronic signals, and with all of these features located in one valve body and moving element and by significantly reducing individual components and eliminating the need for refill/drain tanks within the system In operation, the linear actuator is driven by a command signal from an external central control console. A command signal to drive the linear actuator to a preset value is given from the central control console. This value compared to the feedback value allows the linear actuator to move the throttling gate to its desired position thereby metering flow. Using the same throttling gate, and when the linear actuator is disengaged, flow moving through the internal valve passages will result in a pressure differential working on those surfaces. Once the force on those internal surfaces overcomes the preset spring forces (these defining the preset load) the throttling gate is caused to rapidly shut.

Other envisioned applications of the valve could include anywhere the modulation of hydraulic flow is required. In such an application, the valve will be installed in pipework with fluid flow moving back and forth. Some electronic instrumentation is required to drive the linear actuator and record feedback. The hydraulic velocity fuse is self-contained.

Having described my invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The invention claimed is:

1. A hydraulic valve, comprising:
   a body having an inlet and an outlet;
   a motor supported by said body and operating a shaft extending through an interior of said body, said shaft terminating in a gate;
   a spring supported within said housing and influencing said gate in an open position to permit fluid flow between the inlet and outlet;
   upon occurrence of a pressure differential resulting from a fluid flow through the inlet exceeding a biasing force of said spring, said gate being caused to displace against a valve seat communicating the inlet with the outlet in order to interrupt fluid flow in a standby mode and to define a closed position; and
   said motor operating in a throttling mode to linearly and incrementally displace said gate between the open and closed positions in order to adjust flow through the outlet.

2. The valve as described in claim 1, said shaft further comprising a driven shaft and a roller screw shaft, said roller screw shaft being rotatable with said driven shaft in the throttling mode and linearly displaceable relative thereto in the standby mode.

3. The valve as described in claim 2, further comprising said motor communicating with said driven shaft via a driving timing belt pulley supported within an upper end of said body and accessible upon removal of a cover, said driving timing belt pulley driving a timing belt connected further to a driven timing belt pulley which in turn rotates said driven shaft.

4. The valve as described in claim 2, further comprising said driven shaft being connected to said roller screw shaft via a male spline on said driven shaft and a mating female spline on said roller screw shaft.

5. The valve as described in claim 2, further comprising a pair of upper and lower solenoid valves which are open in the standby mode and closed in the throttling mode.

6. The valve as described in claim 2, further comprising a valve position sensor operating in a continuous feedback loop with said motor to adjust said gate in said throttling mode.

7. The valve as described in claim 2, said roller screw shaft further comprising a section with a larger diameter and a seating seal ring groove which forms a piston that seals against a sleeve configured within said body.

8. The valve as described in claim 7, further comprising inter-engaging pluralities of male and female helical threads configured in opposing fashion between each of a bottom axial extending exterior portion of said roller screw shaft and mating opposing interior helical threads of a roller screw nut fixed within said body, such that rotation of said driven shaft in said throttling mode is communicated to said roller screw shaft to facilitate displacement of said gate.

9. The valve as described in claim 7, further comprising said spring seating between an enlarged annular extending and diameter end portion of said roller screw shaft and an annular bottom support of said valve proximate said piston and the outlet.

10. A passive heave tensioner assembly supported upon a floating platform and adapted for use with a marine riser, the platform connected, via any number of extending supports, to a tensioner ring in turn secured to an outer barrel portion of a slip joint assembly, with a further inner telescopic barrel portion displace-ably supported relative to the outer barrel portion in order to facilitate vertical heave compensating adjustment between the portions responsive to up and down motion, said assembly comprising:
   a plurality of tensioner cylinders arranged in a circumferential array around the platform, said tensioner cylinders each further including internally displacing pistons with extending piston rods connected to the tensioner ring at remote ends thereof;
   a plurality of hydraulic isolation type valves, each supplied by an inlet line extending from a hydraulic fluid accumulator, said valves each including an outlet line extending to a selected one of said tensioner cylinders;
   said valves each further including:
      a body having an inlet communicating with said inlet line and an outlet communicating with said outlet line;
      a motor supported by said body and operating a shaft extending through an interior of said body, said shaft terminating in a gate;
      a spring supported within said housing and influencing said gate in an open position to permit fluid flow between the inlet and outlet;

upon occurrence of a pressure differential resulting from a fluid flow through the inlet exceeding a biasing force of said spring, said gate being caused to displace against a valve seat communicating the inlet with the outlet in order to interrupt fluid flow to said tensioner cylinder in a standby mode and to define a closed position; and said motor operating in a throttling mode to linearly and incrementally displace said gate between the open and closed positions in order to adjust flow through the outlet to said tensioner cylinder.

11. The tensioner assembly of claim 10, further comprising high pressure vessels supplying said accumulators via supply lines.

12. The tensioner assembly of claim 10, further comprising low pressure vessels supplying upper end locations of each of said tensioner cylinders located on opposite sides of said pistons.

13. The tensioner assembly as described in claim 10, said shaft for each of said valves further comprising a driven shaft and a roller screw shaft, said roller screw shaft being rotatable with said driven shaft in the throttling mode and linearly displaceable relative thereto in the standby mode.

14. The tensioner assembly of claim 13, further comprising said motor communicating with said driven shaft via a driving timing belt pulley supported within an upper end of said body and accessible upon removal of a cover, said driving timing belt pulley driving a timing belt connected further to a driven timing belt pulley which in turn rotates said driven shaft.

15. The tensioner assembly of claim 13, further comprising said driven shaft being connected to said roller screw shaft via a male spline on said driven shaft and a mating female spline on said roller screw shaft.

16. The tensioner assembly of claim 13, further comprising a pair of upper and lower solenoid valves incorporated into each of said valve bodies which are open in the standby mode and closed in the throttling mode.

17. The tensioner assembly of claim 13, further comprising a valve position sensor incorporated into each of said valve bodies and operating in a continuous feedback loop with said motor to adjust said gate in said throttling mode.

18. The tensioner assembly as described in claim 13, said roller screw shaft further comprising a section with a larger diameter and a seating seal ring groove which forms a piston that seals against a sleeve configured within said valve body.

19. The tensioner assembly as described in claim 18, further comprising inter-engaging pluralities of male and female helical threads configured in opposing fashion between each of a bottom axial extending exterior portion of said roller screw shaft and mating opposing interior helical threads of a roller screw nut fixed within said valve body, such that rotation of said driven shaft in said throttling mode is communicated to said roller screw shaft to facilitate displacement of said gate.

20. The tensioner assembly as described in claim 18, further comprising said spring seating between an enlarged annular extending and diameter end portion of said roller screw shaft and an annular bottom support of said valve proximate said piston and the outlet.

* * * * *